US012632842B2

(12) United States Patent (10) Patent No.: US 12,632,842 B2
Sandahl Näs et al. (45) Date of Patent: May 19, 2026

(54) EXPRESS MODE PROCESSING

(71) Applicant: Tomra Systems ASA, Asker (NO)

(72) Inventors: Silje Sandahl Näs, Baerums Verk (NO); Kent Vissebråten, Nesbyen (NO)

(73) Assignee: Tomra Systems ASA, Asker (NO)

( * ) Notice: Subject to any disclaimer, the term of this patent is extended or adjusted under 35 U.S.C. 154(b) by 323 days.

(21) Appl. No.: 17/798,773

(22) PCT Filed: Feb. 12, 2021

(86) PCT No.: PCT/EP2021/053558
§ 371 (c)(1),
(2) Date: Aug. 10, 2022

(87) PCT Pub. No.: WO2021/160865
PCT Pub. Date: Aug. 19, 2021

(65) Prior Publication Data
US 2023/0101027 A1 Mar. 30, 2023

(30) Foreign Application Priority Data
Feb. 14, 2020 (EP) ..................................... 20157497

(51) Int. Cl.
G06Q 20/18 (2012.01)
G06Q 20/32 (2012.01)
(52) U.S. Cl.
CPC ........... G06Q 20/18 (2013.01); G06Q 20/327 (2013.01)
(58) Field of Classification Search
CPC .............................. G06Q 20/18; G06Q 20/327
See application file for complete search history.

(56) References Cited

U.S. PATENT DOCUMENTS

2002/0077938 A1 6/2002 Shen
2005/0246225 A1* 11/2005 Jorgensen .......... G06Q 30/0236
705/14.35

(Continued)

FOREIGN PATENT DOCUMENTS

EP 3340192 A1 6/2018
EP 3557513 A1 10/2019

(Continued)

OTHER PUBLICATIONS

International Search Report (PCT/ISA/210) and Written Opinion (PCT/ISA/237) mailed on Mar. 31, 2021, by the European Patent Office as the International Searching Authority for International Application No. PCT/EP2021/053558.

(Continued)

*Primary Examiner* — A. Hunter Wilder
*Assistant Examiner* — Joseph M Mutschler
(74) *Attorney, Agent, or Firm* — Buchanan Ingersoll & Rooney PC

(57) ABSTRACT

A method for an RVM system and an RVM system configured to implement the method. The method includes the steps of: receiving a set of used containers from a user through an infeed; initiating a new collection session and establishing a Session ID; initiating a transfer of the Session ID to a user via physical or digital means after the new collection session has been initiated; establishing a resulting return value for the set of used containers; linking the resulting return value to the Session ID, where the initiating of a transfer of the Session ID to a user is performed before the step of linking the resulting return value to the Session ID.

17 Claims, 9 Drawing Sheets

(56)     References Cited

U.S. PATENT DOCUMENTS

| | | |
|---|---|---|
| 2006/0069588 A1 | 3/2006 | Ritter |
| 2011/0055059 A1* | 3/2011 | Sahai ................... G07F 7/0609 |
| | | 705/30 |
| 2013/0075468 A1 | 3/2013 | Wadden et al. |
| 2018/0118700 A1 | 5/2018 | Shoshan-barmatz et al. |
| 2019/0017863 A1* | 1/2019 | Saltzman ............. G06Q 20/065 |
| 2019/0333028 A1* | 10/2019 | Kucukseyhan, Jr. .. G06Q 10/30 |

FOREIGN PATENT DOCUMENTS

| | | | |
|---|---|---|---|
| WO | 2006096070 A1 | 9/2006 | |
| WO | 2009041825 A1 | 4/2009 | |
| WO | 2011066839 A1 | 6/2011 | |
| WO | 2018000724 A1 | 1/2018 | |
| WO | 2018007524 A1 | 1/2018 | |

OTHER PUBLICATIONS

Office Action (Communication pursuant to Article 94(3) EPC) issued on Jul. 18, 2025, by the European Patent Office in corresponding European Application No. 21 703 852.8-1218, (10 pages).

* cited by examiner

EXPRESS MODE PROCESSING

TECHNICAL FIELD OF THE INVENTION

The invention relates to a method of collecting used containers, such as used food and/or beverage containers, which containers are eligible for a refund; as well as a RVM system configured to execute such a method

BACKGROUND AND SUMMARY OF INVENTION

Devices for receiving, validating and/or sorting used objects, such a used beverage and food containers, and thereafter paying a refund to the user are commonly used in supermarkets. When using the machines, also known as Reverse Vending Machines or RVM:s, the user feeds the used containers to the machine, which process the received object to determine if they are valid and if so gives a receipt to the user stating the amount to be refunded. Such a machine is e.g. described in WO 2009041825 (WO '825). In WO '825 there is described that the user is given the option of participating in a lottery, another perhaps more common alternative is that the user is given the option of giving the amount to be refunded to charity. The machine described in (WO '825) is configured to receive the used containers one by one. Besides RVM: s that receive the objects one by one, there are also RVM: s configured to receive the object in bulk, as e.g. described in WO 2018/007524.

There are RVM: s of different sizes, some are small occupying a floor area of about 1 m², others comprises backroom sorting stations and occupies more than 5 m², more than 10 m² or even more than 20 m².

Conventionally, there are two alternative ways by which the user may receive the refund. According to one alternative, there user wait by the infeed of the RVM until the processing of the containers has finished, thereafter a receipt is printed by a printer having an out feed on the front of the RVM, normally close to the infeed for the containers, and the printed receipt states the value of the refund (in WO '825 the receipt called a token). The user takes the receipt to the check-out station where the receipt is processed and the money paid to the user.

According to the other alternative, a session starts by the user identifying himself to the RVM, which identification links the process in the RVM to an account held by the user. The user accounts, and transactions to and from these accounts, are managed by a managing instance/organisation. After the processing of the containers has been completed the RVM provides information about the session (date, time, refund value) to the managing instance/organisation which automatically increases the value held on the account belonging to the user.

However, both options are associated with disadvantages; and there is a need for an improved way of providing the refund to the user of an RVM.

It is an object of the present invention to overcome or at least alleviate the drawbacks associated with the way refund is handled according to the prior-art and provide a more flexible solution.

According to a first aspect of the invention there is provided a method for an RVM system, which RVM system is configured to collect used containers, such as used food and/or beverage containers, comprising the steps of:

receiving a set of used containers from a user through an infeed opening in the RVM, wherein said set of used containers are preferably received in bulk;

initiating a new collection session in response to at least one of the following events: receipt of said used containers through said infeed opening, receipt of a start command from said user;

establishing a Session ID and transferring or initiating a transfer of said Session ID to a user via physical or digital means after said new collection session has been initiated;

processing each one of said used containers in said set of used containers, which processing comprises establishing the return value of each one of said used containers in said set of used containers and establish a resulting return value, which resulting return value is optionally the total return value of said set of used containers or optionally an array of return values corresponding to the total return value of said set of used containers;

linking said resulting return value to said Session ID;

wherein said step of transferring or initiating a transfer of said Session ID to a user is performed before said step of linking said resulting return value to said Session ID According to a second aspect of the invention there is provided an RVM system configured to collect used containers, such as used food and/or beverage containers comprising:

an infeed opening for receiving set of used containers from a user, which set of used containers is preferably received in bulk;

processing means for processing each one of said used containers in said set of used containers, which processing comprises establishing the return value of each one of said used containers in said set of used containers and determining a resulting return value, which resulting return value is optionally the total return value of said set of used containers or optionally an array of return values corresponding to the total return value of said set of used containers;

transferring means for transferring or initiating a transfer of a Session ID to said user via physical or digital means, and for transferring or initiating a transfer of said resulting return value to said user via digital means;

optional communication means for communication with said user;

optional a moveable closing element for closing the infeed opening;

processing circuitry adapted to:

initiating a new collection session in response to at least one of the following events: receipt of said used containers through said infeed opening, receipt of a start command from said user or the user moving a closing element of the RVM to a closed state whereby said infeed opening is blocked;

establishing a Session ID, linking said Session ID to a respective new collection session, and providing said Session ID to said transferring means;

receiving a resulting return value from said processing means, linking said resulting return value to said session ID and providing said resulting return value to said transferring means;

wherein said processing and/or said transferring means are/is configured to transfer or initiating a transfer of said Session ID to said user before said resulting return value is linked to said Session ID.

By first providing the user with the Session ID without the resulting return value, the user can leave the RVM while it processes the containers; as the user will be provided with the resulting return value by this value being transferred to a physical token held by the user; an electronic device belonging to the user, such as a mobile phone; or to a mobile third party electronic device. This reduces the time a user spends in front of the RVM and thereby creates an improved user experience.

In relation to this invention the term "resulting return value" or "established resulting return value", which are used interchangeably, corresponds to the total return value of said set of used containers. The format of resulting return value may e.g. be a single value, e.g. € 25, or an array of values where each element in the array may e.g. correspond to the return value of a respective container, i.e. the number of elements corresponds to the number of used containers or the number of used containers which are valid. Alternatively, it is an array of values where each element e.g. corresponds to the total return value for a respective type of container (such as the total return value for all 0.5 L containers and all 1.5 L containers, respectively)

According to a third aspect of the invention, there is provided a method for an RVM system, which RVM system is configured to collect used containers, such as used food and/or beverage containers and comprises processing means, transferring means, and process circuitry, the method comprising the steps of:

receiving a set of used containers from a user through an infeed opening in the RVM, wherein said set of used containers are preferably received in bulk;

initiating, by said processing circuitry, a new collection session in response to at least one of the following events: receipt of said used containers through said infeed opening, receipt of a start command from said user;

establishing, by said processing circuitry, a Session ID and transferring or initiating, by said transferring means, a transfer of said Session ID to a user via physical or digital means after said new collection session has been initiated;

processing, by said processing means, each one of said used containers in said set of used containers, which processing comprises establishing the return value of each one of said used containers in said set of used containers and establish a resulting return value, which resulting return value is optionally the total return value of said set of used containers or optionally an array of return values corresponding to the total return value of said set of used containers;

linking, by said processing circuitry, said resulting return value to said Session ID;

wherein said step of transferring or initiating a transfer of said Session ID to a user is performed before said step of linking said resulting return value to said Session ID.

According to a fourth aspect of the invention, there is provided a program for causing an RVM system to:

initiate a new collection session in response to at least one of the following events: receipt of used containers through an infeed opening of said RVM system, receipt of a start command from a user;

establish a Session ID and transfer or initiate a transfer of said Session ID to a user via physical or digital means after said new collection session has been initiated;

establish the return value of each one of said used containers and establish a resulting return value, which resulting return value is optionally the total return value of said set of used containers or optionally an array of return values corresponding to the total return value of said set of used containers;

link said resulting return value to said Session ID;

wherein the transfer or initiating of a transfer of said Session ID to a user is performed before linking said resulting return value to said Session ID.

According to a fifth aspect of the invention, there is provided a used container collection and refund system comprising:

an RVM system according to the second aspect of the invention, and a refund collection point configured to:

receive said Session ID from said user, transmit said Session ID to a central database and receive said resulting return value linked to said Session ID from said central database, transfer a refund corresponding to said resulting return value to said user.

According to a sixth aspect of the invention, there is provided a used container collection and refund system comprising:

an RVM system according to the second aspect of the invention, and a refund collection point configured to:

receive said resulting return value and optionally said Session ID from said user, verify said resulting return value, transfer a refund corresponding to said resulting return value to said user.

According to one embodiment the Session ID is invalidated (made invalid or cancelled) after each withdrawal of refund corresponding to said resulting return value.

According to one exemplifying embodiment of said first, second and third aspects the RVM issues a Session ID which is unique to one or a plurality of the RVM sites; and the Session ID is provided as a optically readable code (such as a bar code or QR code) which code is e.g. printed on a paper or plastic based substrate or displayed to the user on a display screen arranged on the front of the RVM and may be transferred to the user by him taking a photo of the displayed code. According to one exemplifying embodiment the code is generated based on a random PIN code selected by the user, such a code may e.g. comprise only the PIN code and optionally also an RVM ID and/or a time stamp. According to a preferred example of this exemplifying embodiment, the Session ID is provided to the user without the user having to register with any instance, such as an account managing instance, i.e. without the user having to register e.g. an account for receiving the refund. This is advantageous as it speeds up the refund process and allows the user to be anonymous.

According to one exemplifying embodiment the code is printed by a printer having an out feed e.g. on the front of the RVM, normally close to the infeed for the containers.

Additionally or alternatively, the Session ID may be linked a physical property of the user, e.g. biometric information such as a finger print or the look of the retina. According to one example, the Session ID is fully or partly generated based on a physical property of the user. When the Session ID is partly generated based on a physical property of the user, it also contains additional information such as an ID of the RVM and/or a time stamp and/or a random generated code.

According to one exemplifying embodiment, the RVM system transmits the resulting return value and the related Session ID to a central database. When the processing has been completed, and the user would like to collect the refund; he provides the Session ID (i.e. e.g. a code or a finger print as discussed above) to a refund collection point (which may e.g. be a check-out station in a related grocery store, a check-out station in a business location such as in another store or in a bank, or at any other trusted location). The collection point digitally transfers the Session ID to the central database, whereupon the central database transmits the resulting return value which is linked to that Session ID to the collection point, which in turn provides the return value to the user e.g. in cash. See also Act V described below.

Additionally or alternatively, the RVM system transmits the resulting return value to the user, e.g. by providing it to a physical device equipped for digital communication, which device e.g. belongs to the RVM system, the user or a third party. When the processing has been completed, and the user would like to collect the refund; he provides the device (to which the resulting return value has been transferred) and optionally also the Session ID to a refund collection point (which may e.g. be a check-out station in a related grocery store, a check-out station in a business location or other trusted location). which in turn provides the return value to the user e.g. in cash. See also Act V described below. Preferably, the collection point verifies the information in the device before paying the refund, which verification may or may not involve contacting the central database.

According to one example the user contacts the checkout point digitally, e.g. via a homepage.

According to one exemplifying embodiment, after a collection session is initiated a compartment is opened and the user may take a tag provided with the Session ID. Later, when the resulting return value has been established, the return value is wirelessly transferred to the tag—wherein the wireless transfer is configured to reach the user anywhere within e.g. a shopping mall. Alternatively, a stack of tags may be provided in the vicinity of the RVM, or the tag may be a personal tag belonging to the user.

Alternatively, the Session ID and later the resulting return value is provided to the user by digital means, preferably wirelessly such as by WLAN or via internet or the like. According to one example, the RVM system transfers the Session ID and/or the resulting return value, e.g. NFC provided by said RVM system. According to another example, the RVM system initiates a transfer of the Session ID and/or the resulting return value by providing the information e.g. as an SMS to a predetermined destination which SMS is sent from the RVM system and forwarded by third parties outside the RVM system to the predetermined destination according to a given protocol. The SMS is given as an example to explain the term initiating a transfer, there are numerous other ways of initiating a transferring besides proving it as an SMS—as known to the skilled person. Preferably, the act of initiating a transfer of the Session ID and/or the resulting return value, comprises transmitting the Session ID and/or the resulting return value outside of the RVM system.

According to one exemplifying embodiment the RVM is provided with a lockable infeed cover, which prevents the containers belonging to a first user being mixed with the containers belonging to the next user.

The RVM system is preferably configured for receiving the used containers in bulk. By bulk is meant that more than one container can be received by the device simultaneously, and preferably that the containers can be of various material, shapes and sizes such as tin cans, cylindrical, square or odd-shaped bottles, TetraPak containers etc. Furthermore, the food or beverage containers may be made of different materials, such as plastic, paper, metal or glass, or a combination thereof. The device may be adapted for being able to receive and process all or some of the different standard sizes of containers in different countries. It may e.g. be able to handle a mix of 33 cl and 50 cl tin cans, as well as 33 cl, 50 cl and 1.5 l PET bottles.

In certain embodiments, the device is provided with a front wall. A front wall is, in relation to the transporting device, to be understood as being a wall that is substantially parallel with a plane in which the circumferential path is arranged. The front wall is to be understood as extending so that it is arranged adjacent to at least 25% of the circumferential path, preferably adjacent to at least 50% of the portion of the circumferential path extending from the first receiving area to the second receiving area, most preferably adjacent to the entire portion of the circumferential path extending from the first receiving area to the second receiving area. The front wall is to be understood as being offset the transporting device or the center of the container elevating members by at least 3 cm, preferably at least 5 cm, most preferably at least 10 cm. The front wall is to be understood as being offset the transporting device or the center of the container elevating members by no more than 30 cm, preferably no more than 25 cm, most preferably no more than 20 cm. The front wall is to be understood as being offset in the same direction as the container elevating members extend from the transporting device. The front wall is to be understood as being offset the transporting device in a direction that is substantially parallel with the first axis. According to one exemplary embodiment, the transporting device is not provided with a front wall.

According to one example said processing circuitry is arranged locally in the RVM, and all steps of the method is performed there. Alternatively, said processing circuitry is distributed between the RVM, a computer located within the store and/or located at a remote site. The computer(s) may belong one or more of: the owner of the RVM, to the retailer of the RVM, the business or shop housing the RVM, a third party different from those mentioned here, such as a bank or an instance managing accounts.

According to one exemplifying embodiment, said method, further comprises transferring or initiating a transfer of said resulting return value and optionally said Session ID via digital means to a central database, wherein said return value and said Session ID is preferably transferred simultaneously, According to one exemplifying embodiment, said method, further comprises transferring or initiating a transfer of said resulting return value via digital means to said user, and wherein a transfer of said resulting return value via digital means to said user further preferably comprises transferring or initiating a transfer of said resulting return value to an account held by said user.

According to one exemplifying embodiment, said step of initiating a new session by receiving a start command from said user, comprises at least one of: the user entering a command, the user presenting a code to the RVM which is preferably communicated wirelessly to the RVM, the user pressing a button on the RVM, the user moving an infeed cover to a closed state which blocks the infeed opening, the user moving an infeed cover to an open state which expose the infeed opening.

According to one exemplifying embodiment, said step of transferring or initiating a transfer of a Session ID to a user via physical or digital means is performed by an action selected from a group comprising: issuing a physical token to the user; transferring an ID to an electronic device belonging to the user, such as a mobile phone; transferring an ID to a mobile third party electronic device.

According to one exemplifying embodiment, said method further comprises the step of transporting each of said used containers in said set of used containers to a processing station where said processing is initiated.

According to one exemplifying embodiment, said transferring means of said RVM system are configured to transfer or initiating a transfer of said resulting return value via digital means to said user preferably after said resulting return value has been linked to said Session ID.

According to one exemplifying embodiment, said transferring means of said RVM system are configured to transfer or initiating a transfer of said resulting return value to an account held by said user and/or to a central database.

According to one exemplifying embodiment, said start command received from said user, comprises at least one of: a command entered by said user, a code presented by the user presenting to the RVM which is preferably communicated wirelessly to the RVM, a button on the RVM being pressed by the user, said infeed cover being moved by the user moving to a closed state which blocks the infeed opening, said infeed cover being moved by the user to an open state which expose the infeed opening.

According to one exemplifying embodiment, said transferring means of said RVM system are configured transferring a Session ID to a user by an action selected from a group comprising: issuing a physical token to the user; transferring an ID to an electronic device belonging to the user, such as a mobile phone; transferring an ID to a mobile third party electronic device.

According to one exemplifying embodiment, said RVM system further comprises transportation means for transporting each of said used containers in said set of used containers to a processing station where said processing is initiated.

In essence, the invention relates to a method for an RVM system and an RVM system configured to implement the method. The method comprises the steps of: receiving a set of used containers from a user through an infeed; initiating a new collection session and establishing a Session ID; initiating a transfer of said Session ID to a user via physical or digital means after said new collection session has been initiated; establishing a resulting return value for said set of used containers; linking said resulting return value to said Session ID, where the initiating of a transfer of said Session ID to a user is performed before said step of linking said resulting return value to said Session ID.

BRIEF DESCRIPTION OF THE DRAWINGS

FIG. 1b is a top view of a the device illustrated in FIG. 1a.

DETAILED DESCRIPTION OF THE INVENTION

In general, when a user arrives at an RVM system configured in accordance with the invention with a set of used containers, the user performs the following acts:

Act I. The user provides the set of used containers to the RVM through an infeed opening, the containers are preferably provided in bulk.

Act II. The user enables the RVM system to provide a Session ID to the user. This can be enabled e.g. by the user waiting for the RVM to output a physical token, which physical token optionally comprises means for wireless communication. Alternatively, this can be enabled by the user pairing the RVM system with an electronic device equipped for wireless communication, such as pairing it with a personal electronic device (e.g. his cell phone, a personal tag or a laptop) or a hand held electronic device belonging to the RVM system or a third party (e.g. a tag; or a scanner for scanning groceries, which is later returned to the shop at the check out station before the customer pays for the scanned items.). Said pairing is performed to enable the RVM system to provide a Session ID to the user, by e.g. providing the Session ID to the electronic device equipped for wireless communication or to an account belonging the user.

Act III. The user receives a Session ID, but no information about the resulting return value for said set of used containers. The user preferably receives the first Session ID before all of the used containers have been processed. According to one example, the user receives the first Session ID before all of the used containers have been processed e.g. if the number of used containers in said set of used containers exceeds 10, or if the number exceeds 15. If the number of containers in said set of containers is less than 6, or less than 3, or less than 2 the user might receive the Session ID after the resulting return value has been established by the RVM.

Act IV. The user receives information about the resulting return value for said set of used containers.

Act V. The user optionally receives a payment of the resulting return value, or the user might have agreed to that the return value is handled in an alternative manner.

When Act I. may be performed depends on the configuration of the RVM system, according to some embodiments Act I. may be performed any time before Act II. until after Act III. According to some embodiments Act I is required for establishing a new Session ID, and in these instances Act I. has to be performed before Act II.

In addition to the above mentioned acts, the user may also perform one or more additional acts as described herein.

The above mentioned acts are discussed in more detail below:

Act I.

Figure 1A:
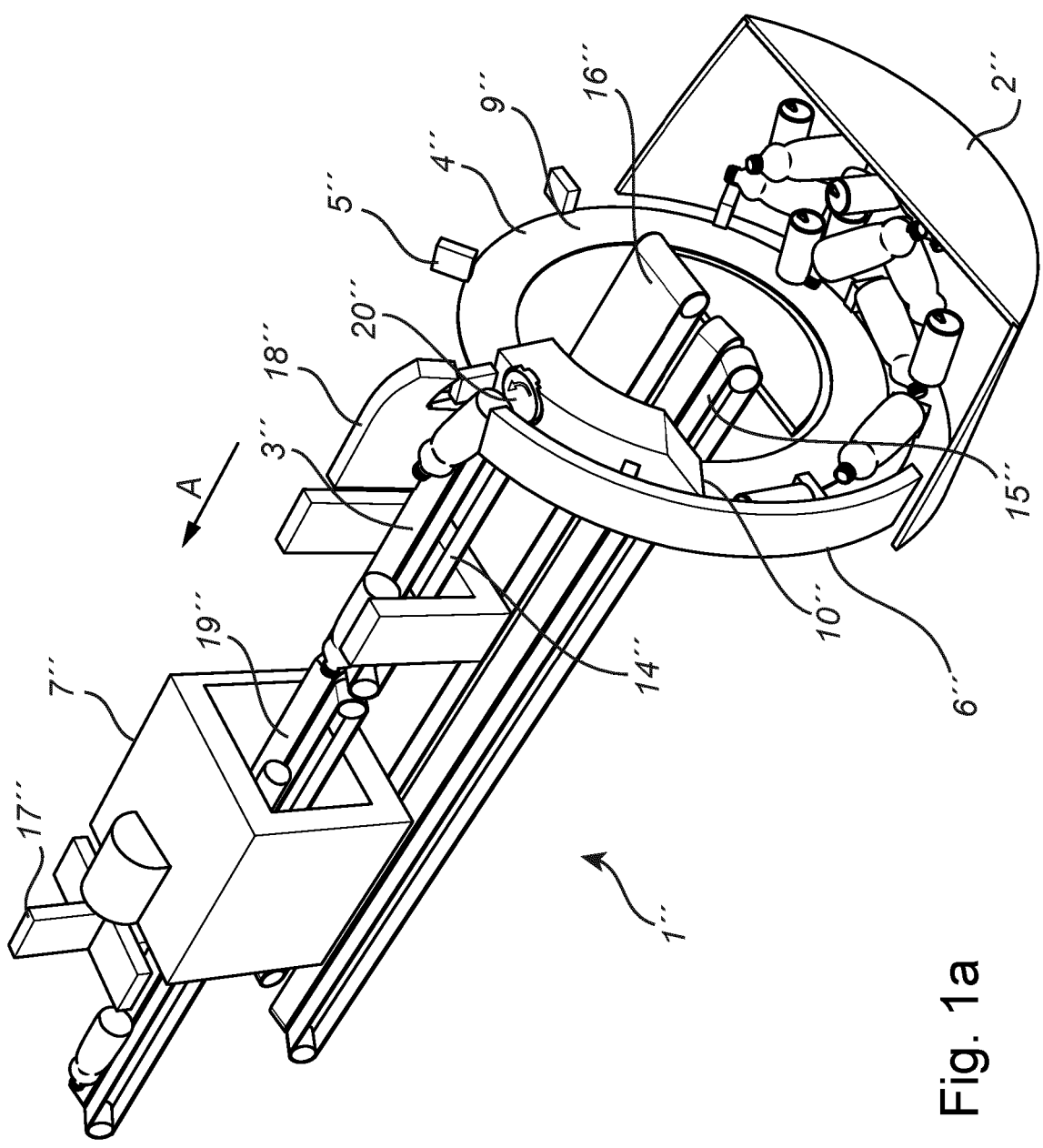
FIG. 1a is a side view of a device for singulation of objects, such as used beverage and food containers, received in bulk into individual objects.

According to one example the containers are provided directly into an open container (2") such as the one shown in FIG. 1a, and the infeed opening is delimited by the upper edge of the inner container walls.

According to an alternative example, the RVM comprises a closing element such as the ones shown in FIGS. 3a-3d, which closing element 101 is movable between a closed state wherein said infeed opening is closed and an open state wherein said infeed opening is open; and said containers are provided through the infeed opening when the closing element is in an open state.

According to an alternative example, the RVM comprises a front having an infeed opening but devoid of a closing element, similar to what is shown in FIGS. 3a-3b with the infeed 100 the but without the closing element 101.

Act II.

According to one example the physical token is a paper with a code such as a bar code printed thereon. This paper non-updatable and is not equipped for wireless communication.

Act III

The act of receiving the Session ID, may comprise receiving a token which comprises information about the Session ID, but which token does not contain information about the resulting return value for said set of used containers.

Act V

Generally, there are numerous ways in which the refund value may be handled besides being paid to the user in cash.

A digital voucher that can be redeemed at check-out in the store/site where the reverse vending takes place.

Transfer to an e-payment account, such as PayPal.

Transfer to bank accounts (held by e.g. a companies, a sports clubs, charity recipients).

Accumulation of loyalty/bonus/discount points.

Participation in lotteries

In general, when a user arrives at an RVM system configured in accordance with the invention with a set of used containers, the RVM systems performs the following acts/steps:

Act A. The RVM receives a set of used containers through the infeed opening.

Act B. The RVM system initiates a New session and establishes a Session ID related to said New session.

Act C. The RVM systems outputs the Session ID so that it may be received by said user, by e.g. sending or transmitting the Session ID to the electronic device equipped for wireless communication or to an account belonging the user. The Session ID is sent to the user without the resulting return value.

According to one exemplifying embodiment, the RVM may output a token which comprises the Session ID, but which token does not contain information about the resulting return value for the set of used containers. The token may be a physical token such as a tag, or electronic information which is sent or transmitted to the user, by e.g. providing the Session ID to the electronic device equipped for wireless communication or to an account belonging the user.

Act D. The RVM processes the set of used containers to determine the return value for each one of the containers in said set of containers, and establishes a return value for said set of used containers. Said processing may e.g. comprise one or more of: determining a material property and/or weight of the container, reading a security mark provided on said container, reading refund information provided on said container, determine a property related to the shape of the container such as the profile and/or the length of the container, classifying said container as valid or invalid. Optionally, said processing comprises retrieving information about one or more of the determined properties from a database.

Preferably the RVM system links the Session ID to the established return value for said set of used containers.

Act E. The RVM systems outputs the established return value for said set of used containers (also referred to as the resulting return value) so that it may be received by said user, by e.g. sending or transmitting the resulting return value to the electronic device equipped for wireless communication or to an account belonging the user.

According to one exemplifying embodiment, the RVM may send or transmit said resulting return value to the token which comprises the Session ID.

Preferably, RVM systems outputs the established return value for said set of used containers together with the related Session ID.

When Act A. occurs depends on the configuration of the RVM system, according to some embodiments Act A. may be performed any time before Act B. until after Act C. According to some embodiments Act A is required for establishing a new Session ID, and in these instances Act A. has to be performed before Act B.

According to one exemplifying embodiment, if a new user gives a command to start a new session while the RVM is still processing containers received from another user, the new user will be asked to wait and/or the infeed cover is kept in its closed state until the new user can enter her containers into the RVM without these being mixed with the containers belonging to the previous user.

In addition to the above mentioned acts, the RVM system may also perform one or more additional acts as described herein.

The above mentioned acts are discussed in more detail below:

Act A.

According to one exemplifying embodiment, the RVM may indicate to the user when the receiving compartment is full, whereupon the user should discontinue infeed of used containers. Once a portion of the provided containers have been processed, the RVM may indicate to user may that the infeed may continue.

Act B.

According to one exemplifying embodiment the act/step where the RVM system initiates a New session and establishes a Session ID related to said New session, may further comprise receiving information from the user about which electronic device Session ID is to be sent to and how this device is to be reached.

According to one exemplifying embodiment, the RVM system initiates a New session in response to one or both of the following events: receipt of a set of used containers through said infeed opening, and receipt of a start command from said user. According to one example, the receipt of a start command from said user, may comprises at least one of: the user entering a command (e.g. via a key pad attached to the RVM, by pressing on a display attached to the RVM, or by using his voice), the user presenting a code to the RVM which is preferably communicated wirelessly to the RVM (e.g. by being scanned/photographed by a camera or transferred via e.g. IR or NFC communication), the user pressing a button on the RVM, the user moving the infeed cover to a closed state where it blocks the infeed opening, the user moving an infeed cover to an open state where it exposes the infeed opening.

Act D.

According to one exemplifying embodiment the RVM system initiates the processing of the used containers to determine the return value in response to the infeed cover has been moved to a closed state (after the set of containers have been received by the RVM).

According to one alternative embodiment the RVM system initiates the processing of the used containers to determine the return value while the infeed cover is still in an open state.

According to one exemplifying embodiment the user may re-open the infeed cover to put in more containers after the processing has been initiated, and these containers are assigned the same Session ID.

WO 2018/00724 describes an RVM system for handling used containers received in bulk in detail, this document is hereby incorporated by reference and a summary is provided below.

An RVM system also referred to as a device 1", for receiving objects, such as empty disposable hollow bodies, e.g. used food and/or beverage containers, in bulk and forwarding them individually for further processing will now be discussed more in detail with reference to the appended drawings. In this document, used beverage or food containers may also be referred to as objects.

The bulk of food and/or beverage containers received by the device 1" may be assorted and of different shapes and sizes. For example, the containers may be cans, odd-shaped, cylindrical or square bottles, TetraPak containers etc. The used beverage or food containers typically have an elongated shape, they can for example be substantially cylindrical. Furthermore, the food or beverage containers may be made of different materials, such as plastic, paper, metal or glass, or a combination thereof.

The device 1" may be adapted for being able to receive and process the different standard sizes of containers in different countries.

The device 1" may be placed in a cabinet. As an alternative the device may be free-standing. The device 1" may be located in e.g. a local store, a residential area or a car park, for receiving and processing used beverage and/or food containers from consumers, or in an industrial building for sorting and processing of used beverage or food containers. The device 1" may also be placed in e.g. cargo container, e.g. at a festival area, for receiving used beverage and/or food containers. Moreover, the device 1" may be used to upgrade an existing reverse vending machine, and be placed in a cabinet of such a reverse vending machine. Optionally, some of the existing hardware and/or software are used also after the upgrade. Hence, the size of the device may be adapted to the standard size of already existing reverse vending machines.

Figure 1B:
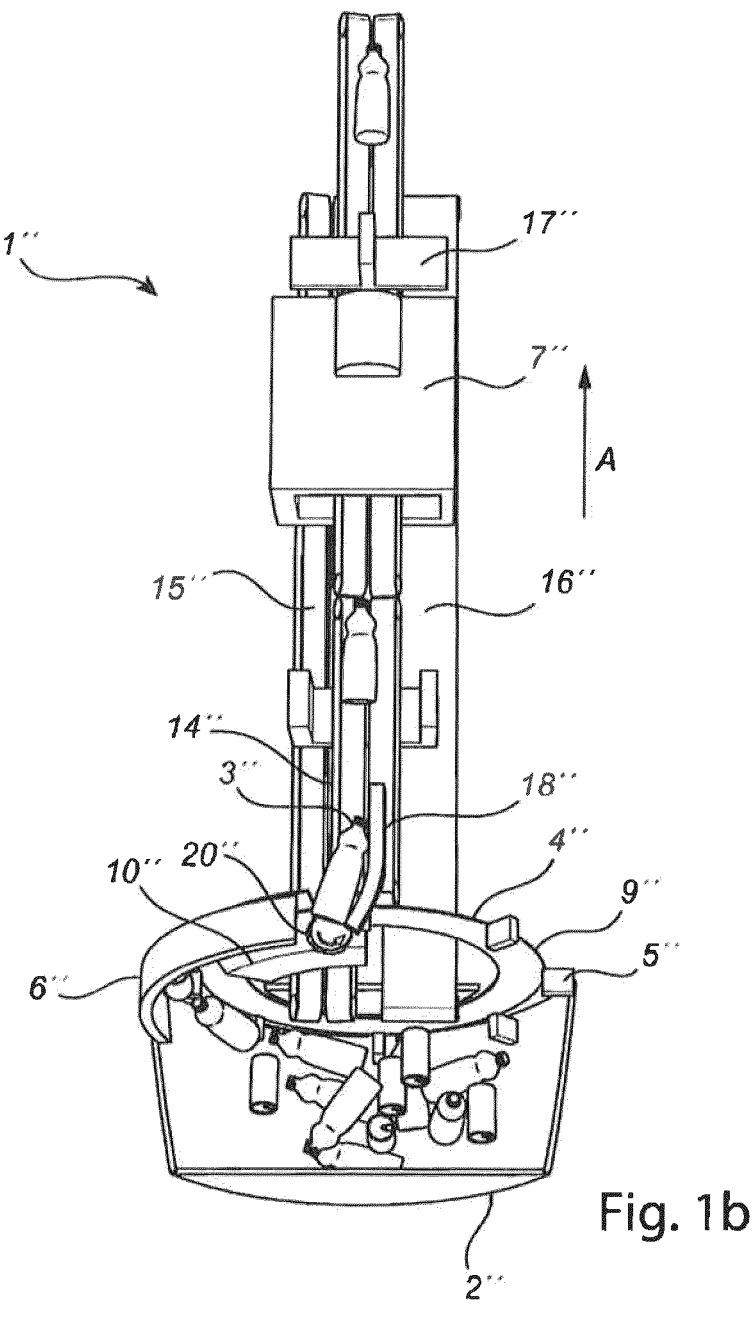

A first example of the device 1" will now be discussed in detail with reference to FIGS. 1a and 1b. The device 1" in FIG. 1a has a first receiving area 2" into which the containers are collected after entering the device. The device 1" comprises a rotatable transporting device 4" provided with an elevating member 5" for transporting containers from the first receiving area 2" to a second receiving area 3". The elevating member 5" moves along and is locked to a circumferential path around a first axis upon activation of the transporting device 4", which first axis x is inclined at an angle of 0 to 45° relative the horizontal plane.

Upon activation, here rotation, of the transporting device 4", the elevating member 5" randomly brings the containers, one by one, from the first receiving area 2" to the second receiving area 3".

The container is elevated by the elevating member 5" from the first receiving area 2" by a scooping, pushing or nudging action.

When the container is at a predetermined vertical position, the so-called drop-off point, it leaves the elevating member 5" of the transporting device 4 and falls by means of gravity, alternatively slides off by a sliding motion, to the second receiving area 3".

The container may then be forwarded to an processing station 19" provided with inspection means 7" for i.a. establishing of the return value, see FIG. 1.

Based on the result at the processing station, the container may be forwarded for at least one of further inspection, counting, recording, evaluating, sorting, storing, recycling, be returned to the user (if invalid), or be returned to the first receiving area 2".

The transporting device 4" may be designed in different ways, as discussed in more detail in WO 2018/00724.

The transporting device 4" may be activated by a motor. Additionally or alternatively, the transporting device 4" may be activated by a driving wheel (not shown) arranged such that it is in contact with the transporting device 4".

Upon activation of such driving wheel, by e.g. a motor, the transporting device may be activated. The motor may be controlled by a control unit.

The transporting device 4" may be made of metal, plastic, wood or a combination thereof.

The transporting device 4" may further comprise a retaining means 6". The purpose of the retaining means 6" is to retain the containers in the transporting device 4" when bringing the containers from the first receiving area 2" to the second receiving area 3". Different configurations of the retaining means are discussed in more detail in WO 2018007524 As shown in FIG. 1, the first receiving area 2" may be formed as a receptacle.

As an example the first receiving area may be bowl-shaped.

The bottom of the first receiving area 2" may be curved having the same or a similar curvature as the periphery of the transporting device 4".

The first receiving area 2" may be adapted such that the elevating member 5" travelling through the first receiving area 2" may be able to bring containers from the first receiving area.

A lower vertical portion of the transporting device 4" may form an inner wall of the first receiving area 2".

The first receiving area 2" may be made of e.g. metal and/or plastic.

The conveyor belt of the third receiving area may be a V conveyor or a flat conveyor.

According to this embodiment the second receiving area 3" and the third receiving area 14" is one and the same. Such arrangement may comprise solely of a conveyor belt onto which the containers fall and are transported to the container processing station 19".

As a further alternative if the second receiving area 3" and the third receiving area 14" are the same, the arrangement may comprise solely of a plate made of a material with low surface friction, such as metal or a suitable plastic material, which is tilted towards the processing station 19" such that the containers received at the combined second and third receiving area slides towards the processing station 19.

As seen in FIG. 1, the device 1 may further comprise a processing station 19" provided with inspection means 7" through which the containers are transported in order to establish the return value and optionally identify the container. Based on the information obtained by the inspection means 7", the container may be either accepted (if valid, i.e. eligible for being collected and a refund) or rejected (if invalid, i.e. not eligible for a refund). There are several different options how an accepted or rejected container can be handled.

According to one example, if being accepted the container may be forwarded to a box (not shown), for example a box for containers to be recycled. As an alternative there may be several different boxes to which an accepted container may be forwarded, depending on e.g. the type and/or size of the container.

If being rejected, the container may be transported back to the first receiving area 2", back to the user, or directly to a trash collector.

The inspection means 7" may comprise a camera or a scanner, such as a bar code reader. The inspection means may also comprise means for identifying material properties.

As an example, the inspection means 7" may be an OneRing system which comprises a camera for identifying a large part of the container. The camera of the OneRing system may be able to handle 80 to 220 objects per minute. There may be further number and types of inspection means, e.g. cameras, scanners etc., arranged in series or in parallel in order to obtain different information of the containers such that the containers can be validated and/or sorted based on this information.

The processing station 19" may further be provided with a decision unit arranged for receiving a signal from the inspection means 7" and based on this signal being arranged to send a container to a sorting station, back to the first receiving area 2" or to an outfeed 21" of the device 1".

A container may be rejected if the inspection means 7" is not able to identify the container. If being rejected, the container may be sent back to the first receiving area 2" in order to provide for another read of the container. This may be done by a conveyor belt 16" positioned beneath the processing station 19" with respect to the transport direction A of a container in the second receiving area 3" and/or third receiving area 14".

After being identified the container may be sorted by means of a propeller wheel 17". The propeller wheel and the conveyor belts 15" and 16" arranged are described in more detail in WO 2018007524.

As an alternative, a rejected container may be returned back, via an outfeed to the user, such that the user can determine whether he or she should insert the container in the device once again, throw away or keep the container.

This may be done by a conveyor belt.

The first receiving area 2" may be mounted onto brackets which may be mounted onto or in connection with a trash collector 12". Such a trash collector may hence be situated below the first receiving area 2". The trash collector may have any shape, e.g. rectangular shape.

The trash collector may be releasable connected to the device such that it can be released and the trash collector can be emptied.

The containers ending up in the trash collector may be taken care of and sorted manually or just being regarded as garbage.

The device 1" may further comprise an infeed for facilitating the containers to enter the first receiving area 2".

In the absence of infeed, there may only be an opening in e.g. a cabinet in which the device 1" is placed, to which the containers can be fed. Such an opening may hence be arranged adjacent to the first receiving area 2". The size of the opening may be adapted to allow containers of different sizes and shapes to enter into the device 1 and to fulfill the requirements of the safety standard NS-EN 349:1992+A1: 2008.

Moreover, the distance between the opening and the transporting device 4" may be adapted to fulfill the requirement of the standard, ISO 13857:2008, Safety of machines.

According to a further safety standard, ISO 13857:2008 of machines, the opening should comprise different safety arrangement for preventing injuries.

For example, it can comprise a light curtain with a light beam which functions such that, when the device 1" is running, the device is immediately shut down when the light beam is broken.

The infeed may comprise a tray which may be slightly tilted with respect to the horizontal plane in order to facilitate the containers to be forwarded to the first receiving area 2". The infeed and a tray is described in more detail in WO 2018007524.

Figure 2:
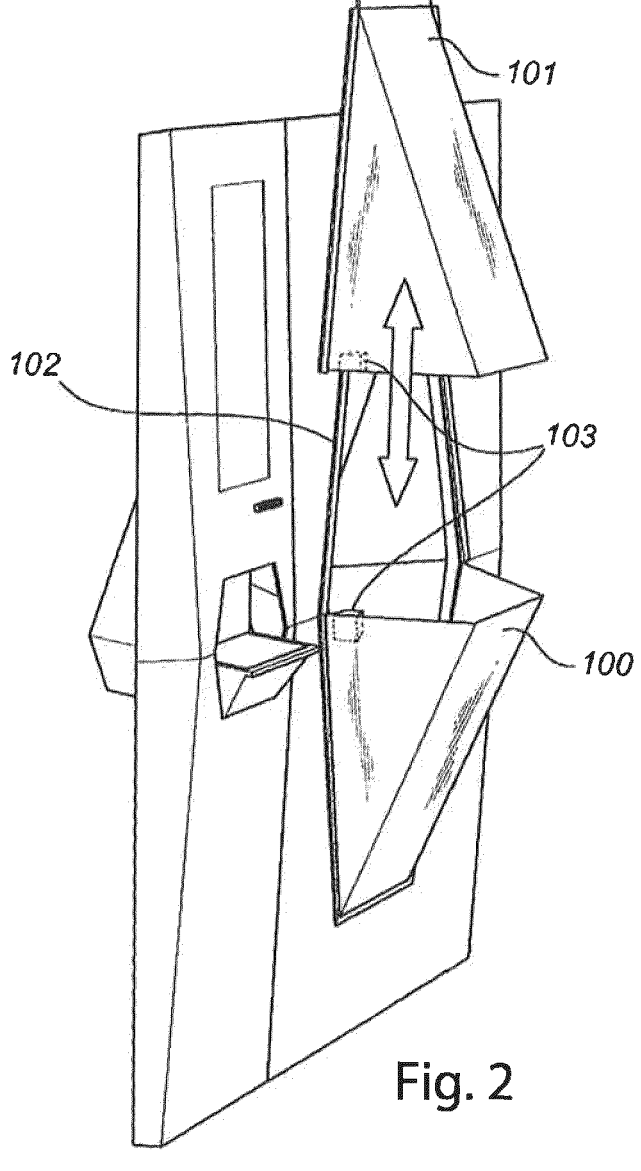
FIG. 2 is a perspective view of a front of a reverse vending machine 25 comprising a closing device, wherein said closing device is in an open state.
Figure 4:
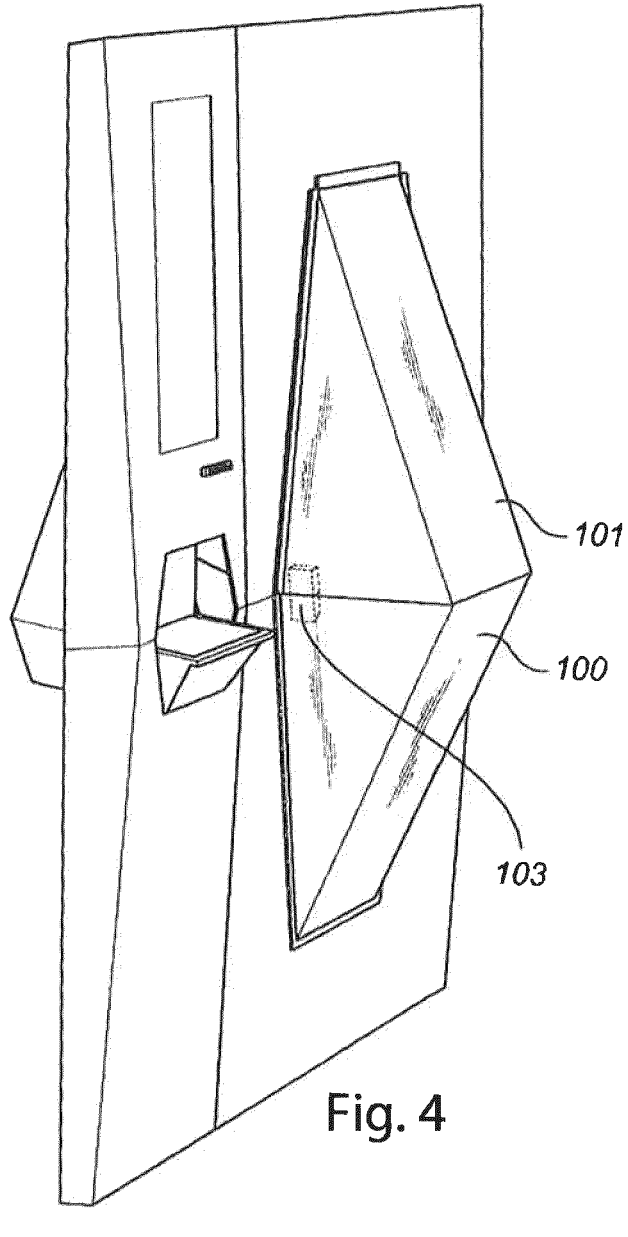
FIG. 4 is a perspective view of a front of a reverse vending machine comprising a closing device wherein said closing device is in a closed state.

The RVM system 1 of FIGS. 2 and 4 comprises:

a first receiving area arranged for simultaneously receiving and keeping a plurality of containers which are to be singulated;

a first singulation transporting device comprising a container singulator, which also may be referred to as elevating member, for transporting individual containers from the first receiving area to a second receiving area, a second transporting device for transporting individual containers from the second receiving area to an inspection station, where the validity of the container is determined, and a front comprising an in-feed 100 for guiding a bulk of containers towards the first receiving area, wherein the front further comprises:

a movable closing device 101 for closing the in-feed, which closing device is movable between an open state wherein the in-feed is open, and a closed state wherein the in-feed is closed, and optionally automatic locking device configured to lock the movable closing device in the closed state at the start of a container singulation session, and unlock the movable closing device at the end of the container singulation session.

In this document the terms movable closing device and closing element are used interchangeably.

Figure 3:
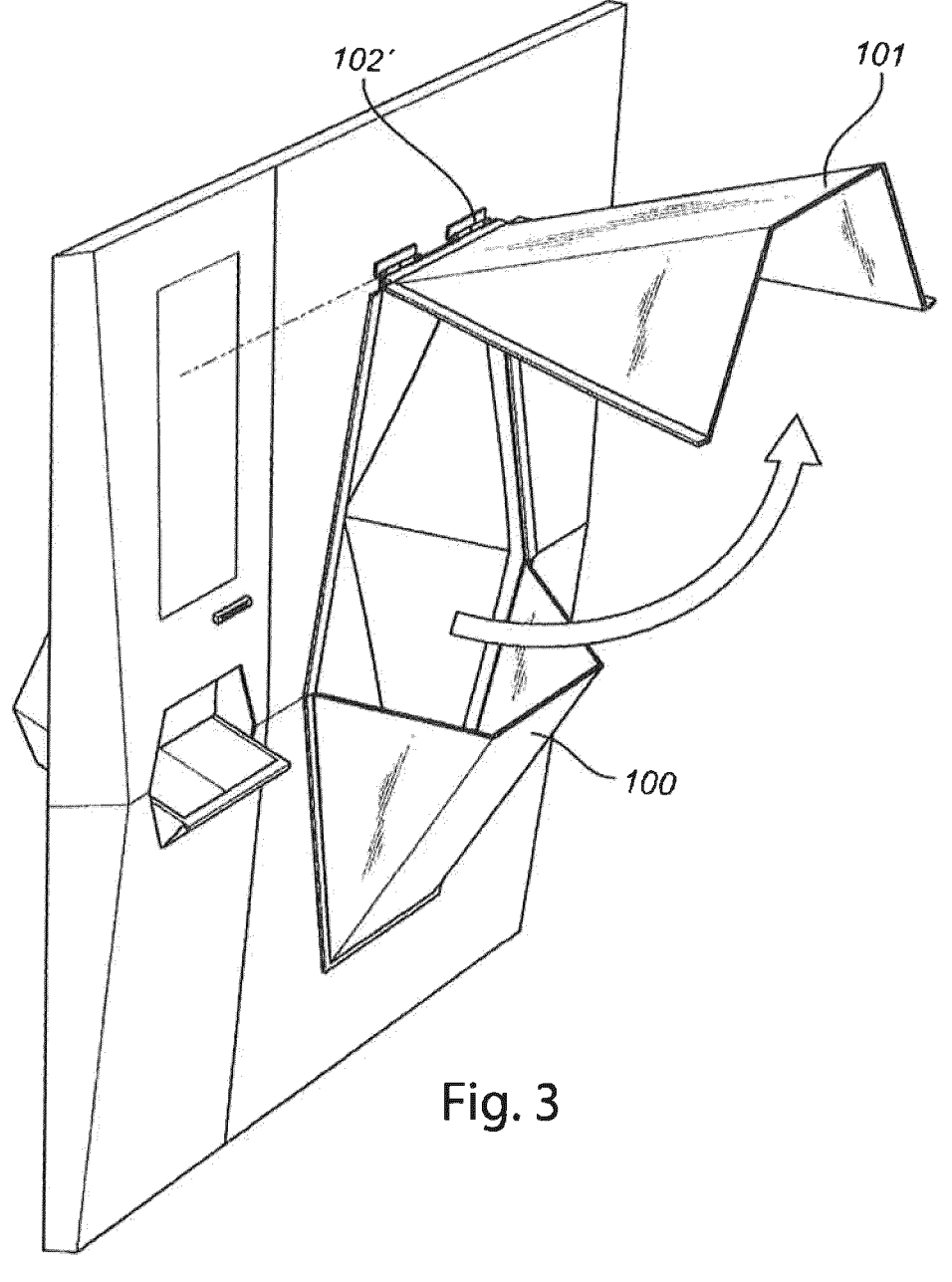
FIG. 3 is a perspective view of a front of a reverse vending machine comprising a closing device, wherein said closing device is in an open state.

In FIG. 2 the movable closing device is arranged in the open state, and in FIG. 4 the movable closing device is arranged in the closed state. As can be seen in FIGS. 2 and 3 the movable closing device is arranged up stream of the in-feed, and is moved between the open and closed state by a translating non-rotational movement following the outside surface of the front.

The direction of motion of the movable closing device is controlled by guides 102 attached to the front of the reverse vending machine; to which guides the movable closing device is attached.

The size of the opening of the in-feed may be adapted to allow containers of different sizes and shapes to enter into the device 1 and to fulfill the requirements of the safety standard NS-EN 349:1992+A1:2008.

Moreover, the distance between the opening and the singulation transporting device may be adapted to fulfill the requirement of the standard, ISO 13857:2008, Safety of machines.

According to a further safety standard, ISO 13857:2008 of machines, the opening should comprise different safety arrangement for preventing injuries. For example, it can comprise a light curtain with a light beam which functions such that, when the device 1 is running, the device is immediately shut down when the light beam is broken.

The infeed may comprise a tray which may be slightly tilted with respect to the horizontal plane in order to facilitate the containers to be forwarded to the first receiving area.

The infeed 100 may be made of a plastic material, metal and/or wood.

The infeed 100 may further comprise rims on both sides in order to retain the containers being forwarded towards the first receiving area and to prevent the containers from falling off the infeed upon being forwarded to the first receiving area.

The tray may be provided with slits in order to handle loose objects, e.g. pieces of paper such as labels from containers, into which the loose objects can fall.

Loose objects may fall onto a steep surface located below the infeed and be guided directly or via a funnel to a trash collector.

The trash collector may, but need not, be the same as the trash collector or containers discussed above.

The infeed may further comprise a conveyor belt in order to further facilitate transport of the containers from the tray towards the first receiving area. The conveyer belt may be arranged between the tray and the first receiving area of the device 1 and hence being adapted to the size of the infeed and the opening of the device.

Such a conveyor belt may comprise rims on both sides in the longitudinal direction in order to prevent the objects from falling off from the conveyor and to retain the containers towards the first receiving area.

The conveyor belt may be positioned substantially horizontal with respect to the horizontal plane.

Alternatively, the infeed may comprise solely a tray or solely a conveyor belt. FIG. 3 is a perspective view of a front of a reverse vending machine illustrating an alternative example in the open state. This example is equal to the one shown in FIGS. 2 and 4, except that the movable closing device is attached to the front by means of hinges, to that the movable closing device may be rotated between an open and closed state. In the closed state the position of the movable closing device is equal to the one illustrated in FIG. 4.

Figures 5A, 5B:
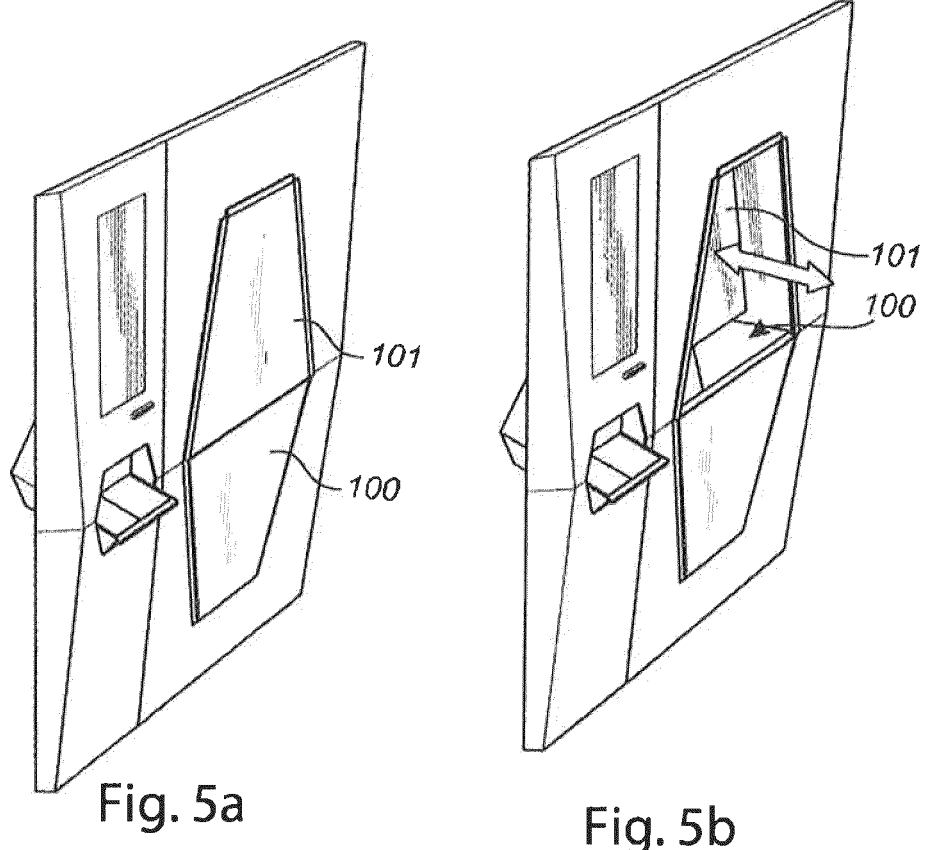
FIGS. 5a and 5b are a perspective views of a front of a reverse vending machine comprising a closing device, wherein said closing device is in a closed state and an open state, respectively.

FIG. 5b is a perspective view of a front of a reverse vending machine illustrating an alternative example in the open state. This example is equal to the one shown in FIGS. 2 and 4, except that the movable closing device is moved between the open and closed state by a translating non-rotational movement, which movement follows a direction transverse or orthogonal to the front surface of the machine as illustrated by the double arrows. FIG. 5a shows this movable closing device in the closed state.

Figures 6A, 6B:
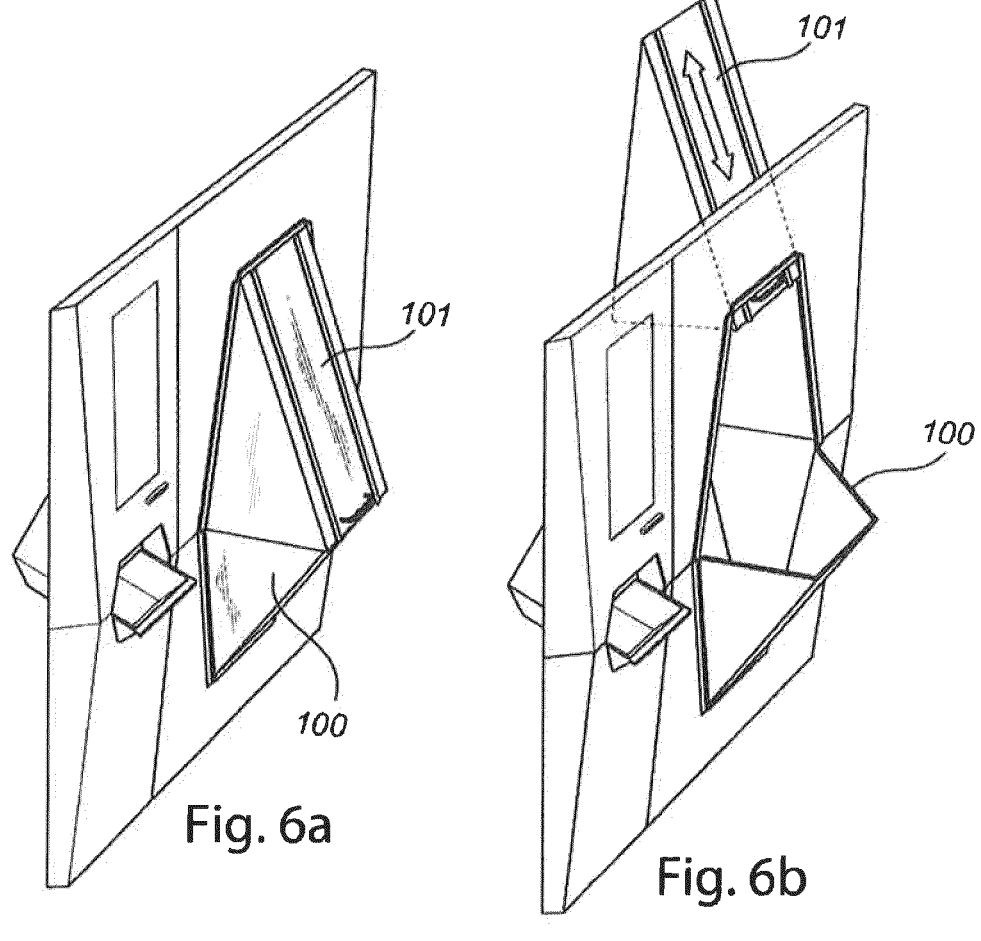
FIGS. 6a and 6b are a perspective views of a front of a reverse 10 vending machine comprising a closing device, wherein said closing device is in a closed state and an open state, respectively.

FIG. 6b is a perspective view of a front of a reverse vending machine illustrating an alternative example in the open state. This example is equal to the one shown in FIGS. 2 and 4, except that the movable closing device is moved between the open and closed state by a translating non-rotational movement, which movement follows a direction transverse or to the front surface of the machine as illustrated by the double arrows. The direction of motion crosses the front surface of the machine at an angle between 5° and 80°, or between 10° and 60°. FIG. 6a shows this movable closing device in the closed state.

In the example s illustrated in FIGS. 2-6b the movable closing device is arranged up stream of the infeed.

Figure 7:
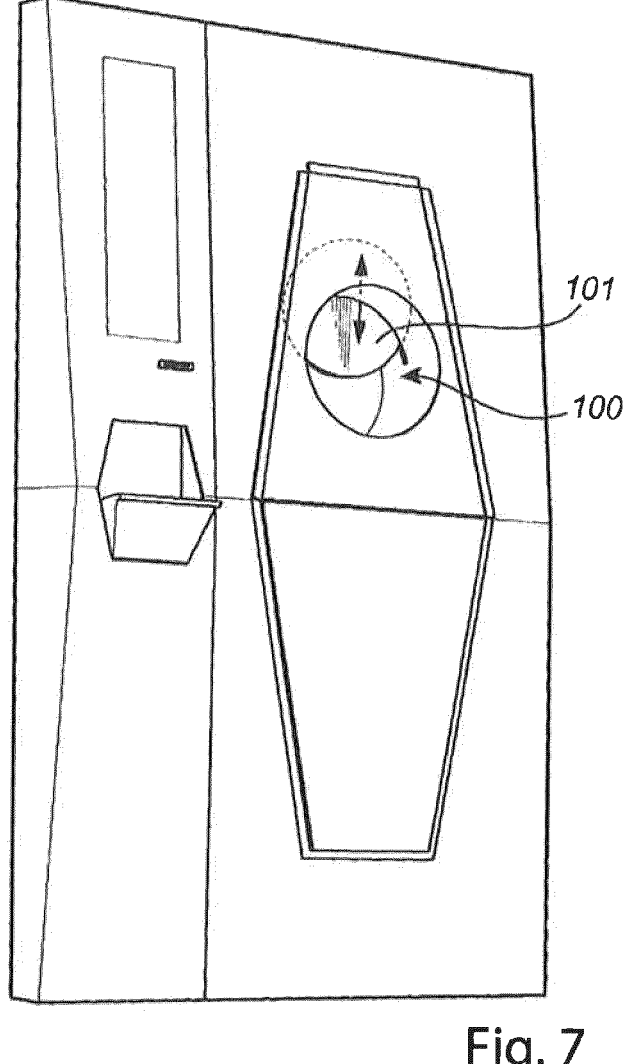
FIG. 7 is a perspective view of a front of a reverse vending machine comprising a closing device, wherein said closing device is in an intermediate state.

FIG. 7 is a perspective view of a front of a reverse vending machine illustrating an alternative example in an intermediate state, i.e. in a state between the open state and the closed state. This example is equal to the one shown in FIGS. 2 and 4, except that the movable closing device is flat and arranged within the infeed of the device; i.e. it is arranged downstream of the opening of the infeed and up-stream of the end of the in-feed. The movable closing device is moved between the open and closed state by a translating non-rotational movement, which movement may follow a direction parallel to the front surface of the machine as illustrated by the double arrows. When the movable closing device is arranged in the closed state, it fully covers the passage formed by the infeed.

Figure 8:
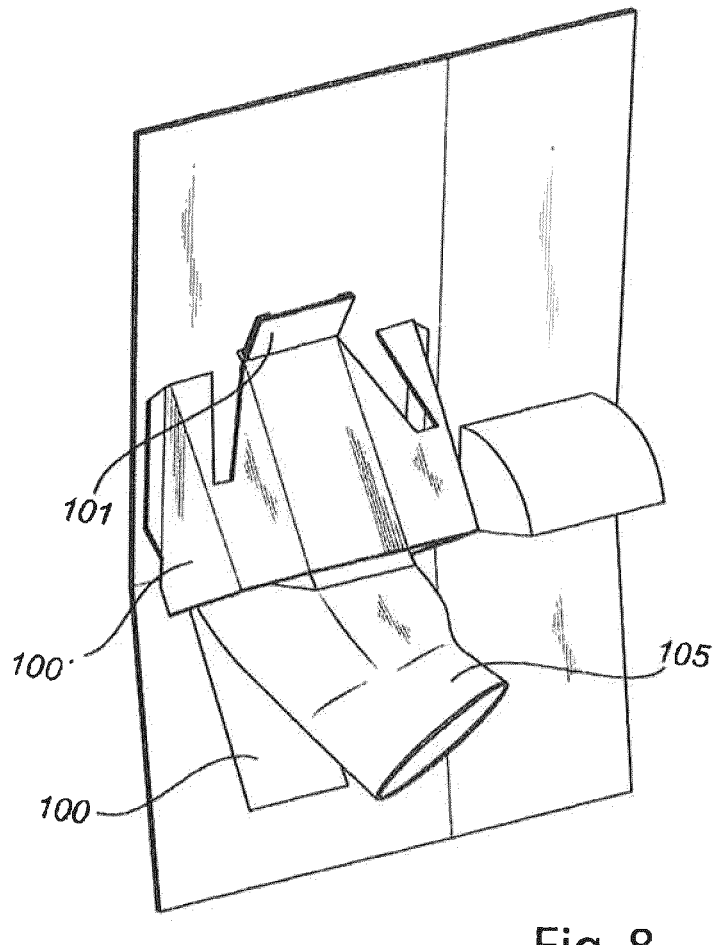
FIG. 8 is a perspective view of a front of a reverse vending machine comprising a closing device as seen from the back.

FIG. 8 is a perspective view of the front illustrated in FIGS. 6a and 6b, as seen from the back of the front. Here an optional funnel is provided, for guiding the containers towards the first receiving area. Moreover, an optional back of the infeed 100' is shown.

Now follows, an exemplifying sequence of steps that may be used for controlling the in-feed of the reverse vending machine. First a bulk of objects are received through the in-feed of the reverse vending machine, 1001.

Thereafter the singulation process is started, 1010, or the movable closing device is closed and locked, 1020. That the singulation process is started before the closing of the movable closing device enables for the user to enter so many containers that a predetermined fill-level of the machine is reached and no more containers can or should be inserted (e.g. because the machine signals that to the user), await that some of the containers provided to the machine are processed so that the fill-level of the machine decreases, whereafter the user may add more containers into the machine. When the user has provided all his/her containers into the machine, 1011, the movable closing device is closed (manually or automatically), 1020, and automatically locked, 1021, so that the user may leave the machine while the machine continues to process the containers. Once the singulation process has been completed, 1012, the moveable closing device is unlocked.

Alternatively, the movable closing device is closed and optionally locked, 1020 and 1021, before, or at the same time as, the singulation process starts, 1010, this has the advantage that the user is protected from injuries caused by moving parts inside the machine, which parts are active at the singulation process; it also has the advantage of reducing noise caused by the singulation process during the whole singulation process.

According to one exemplifying example, the in-feed is open in the idle state, i.e. when the machine is waiting for a new user. Alternatively, the in-feed is closed in the idle state.

According to one method of operating a reverse vending machine for singulation of used beverage or food containers received in bulk into individual objects, the method comprising the steps of:

providing a reverse vending machine having a first receiving area arranged for simultaneously receiving and keeping a plurality of containers which are to be singulated; an in-feed; a first singulation transporting device for individual transporting of containers from a first receiving area to a second receiving area; a movable closing device for closing the in-feed, which closing device is movable between an open state wherein the in-feed is open, and a closed state wherein the in-feed is closed;

receiving a bulk of used beverage or food containers through the infeed;

receiving and keeping the bulk of used beverage or food containers at the a first receiving area;

individual transporting of containers from the first receiving area to a second receiving area, protecting the user of the reverse vending machine, wherein the step of protecting the user comprises the steps of:

providing an automatic locking device, providing an activation signal to the automatic locking device when the moveable closing device is to be locked, which activation signal is issued based on one or two or all of the following: the number of objects received at the first receiving area, the rate at which containers or objects are received at the first receiving area, the position of the movable closing device, providing a deactivation signal to the automatic locking device when the moveable closing device is to be unlocked, which activation signal is issued based on one or both of the following: the number of objects or containers present in the first receiving area, and the container transportation rate from the first receiving area to the second receiving area, or comprises the step of:

preventing a start of the individual transporting of containers from the first receiving area to a second receiving area while the moveable closing device is in an open state, or comprises the step of:

halting the first singulation transporting device and discontinuing the individual transporting of containers from the first receiving area to a second receiving area in response to a movement of the movable closing device to an open state.

The step of receiving and keeping the bulk of used beverage or food containers at the first receiving area may further comprises the step of continuously single out individual containers from the bulk of containers in the first receiving area, and transporting the individual container from the first receiving area to a second receiving area which second receiving area is arranged at a higher vertical level.

The invention has been described with reference to some detailed examples, however the skilled person realizes that a number of modifications of the embodiments described herein are possible without departing from the scope of the invention, which is defined in the appended claims. The method according to the invention is naturally applicable other types of bulk sorters then the one in the appended drawings. For example, the design of the transportation device including the container elevating members may be scaled or given different designs depending on e.g. the material, size, shape and weight of the containers that the singulation device is to be able to handle. Guided by this description and possibly in combination with some testing the person skilled in the art will be able to find a suitable design. Furthermore, the reverse vending machine of the present inventive concept may have an alternative configuration and may e.g. comprise alternative means for singulating used beverage or food containers, such as those disclosed in US2012118700 or EP2014/052546. When using the reverse vending machine of the present inventive concept with the singulation transporting device of EP2014/052546, the inlet may guide the containers towards the middle portion of the rotating surface, i.e. towards a first receiving area, where the containers are then singulated by means of the device disclosed in EP2014/052546. In more detail the objects may e.g. have a more spherical or half spherical profile such as plate like container.

The invention claimed is:

1. A method for a Reverse Vending Machine (RVM) system, which RVM system is configured to collect used containers, the method comprising the steps of:

receiving a set of used containers from a user through an infeed opening in the RVM, wherein said set of used containers are received in bulk; and initiating a new collection session on processing circuitry in response to at least one of the following events: receipt of said used containers through said infeed opening and closing of said infeed opening with a moveable closing element, receipt of a start command from said user, the processing circuitry:

establishing a Session ID and transferring or initiating a transfer of said Session ID to a user via physical or digital means after said new collection session has been initiated, said digital means being one of a Wireless Local Area Network (WLAN) communication, an Internet communication, a Near-Field Communication (NFC), or a Short Message Service (SMS) communication;

processing each one of said used containers in said set of used containers, which processing comprises establishing the return value of each one of said used containers in said set of used containers and establish a resulting return value, which resulting return value is the total return value of said set of used containers or an array of return values corresponding to the total return value of said set of used containers;

linking said resulting return value to said Session ID;

invalidating the Session ID after a withdrawal of a refund corresponding to said resulting return value; and wherein said step of transferring or initiating a transfer of said Session ID to a user is performed before said step of linking said resulting return value to said Session ID.

2. The method according to claim 1, wherein:

said set of used containers is received in bulk; and said resulting return value is linked to said Session ID so as to enable a user to collect the refund corresponding to said resulting return value upon presentation of said Session ID.

3. The method according to claim 1, further comprising transferring or initiating a transfer of said resulting return value and said Session ID via said digital means to a central database, wherein said return value and said Session ID is preferably transferred simultaneously.

4. The method according to claim 1, further comprising transferring or initiating a transfer of said resulting return value via said digital means to said user, and wherein a transfer of said resulting return value via said digital means to said user further preferably comprises transferring or initiating a transfer of said resulting return value to an account held by said user.

5. The method according to claim 1, wherein said step of initiating a new session by receiving a start command from said user, comprises at least one of: the user entering a command, the user presenting a code to the RVM which is preferably communicated wirelessly to the RVM, the user pressing a button on the RVM, the user moving an infeed cover to a closed state which blocks the infeed opening, the user moving an infeed cover to an open state which expose the infeed opening.

6. The method according to claim 1, wherein said step of transferring or initiating a transfer of said Session ID to the user via said physical or digital means is performed by an action selected from a group comprising: issuing a physical token to the user which physical token comprises said session ID; transferring an ID to an electronic device belonging to the user; transferring an ID to a mobile third party electronic device, wherein said issuing of said physical token to the user which physical token comprises said session ID comprises printing a barcode on a substrate comprising paper and/or plastic.

7. The method according to claim 1, further comprising the step of transporting each of said used containers in said set of used containers to a processing station where said processing is initiated.

8. The method according to claim 1, wherein the processing circuitry is configured to:

lock the moveable closing element in a locked state until the processing of each one of said used containers in said set of used containers has been completed.

9. The method according to claim 1, wherein the processing circuitry is configured to:

provide an activation signal to an automatic locking device when the moveable closing element is to be locked, the activation signal being issued based on one or two or all of the following: a number of objects received at a first receiving area, a rate at which said user containers in said set of used containers are received at the first receiving area, and a position of the movable closing device.

10. A Reverse Vending Machine (RVM) system configured to collect used containers, the system comprising:

an infeed opening for receiving set of used containers from a user, which set of used containers is received in bulk;

processing circuitry for processing each one of said used containers in said set of used containers, which processing comprises establishing the return value of each one of said used containers in said set of used containers and determining a resulting return value, which resulting return value is the total return value of said set of used containers or an array of return values corresponding to the total return value of said set of used containers;

transferring means for transferring or initiating a transfer of a Session ID to said user via physical or digital means, and for transferring or initiating a transfer of said resulting return value to said user via said digital means, said digital means being one of a Wireless Local Area Network (WLAN) communication, an Internet communication, a Near-Field Communication (NFC), or a Short Message Service (SMS) communication;

communication means for communication with said user;

a moveable closing element for closing the infeed opening;

the processing circuitry adapted to:

initiating a new collection session in response to at least one of the following events: receipt of said used containers through said infeed opening, receipt of a start command from said user or the user moving a closing element of the RVM to a closed state whereby said infeed opening is blocked;

establishing a Session ID, linking said Session ID to a respective new collection session, and providing said Session ID to said transferring means;

receiving a resulting return value from said processing means, linking said resulting return value to said session ID and providing said resulting return value to said transferring means;

invalidating the Session ID after a withdrawal of a refund corresponding to said resulting return value; and wherein said processing circuitry and/or said transferring means are/is configured to transfer or initiating a transfer of said Session ID to said user before said resulting return value is linked to said Session ID.

11. The RVM system according to claim 10, wherein said transferring means are configured to transfer or initiating a transfer of said resulting return value via said digital means to said user preferably after said resulting return value has been linked to said Session ID.

12. The RVM system according to claim 11, wherein said transferring means are configured to transfer or initiating a transfer of said resulting return value to an account held by said user and/or to a central database.

13. The RVM system according to claim 10, wherein said start command received from said user, comprises at least one of: a command entered by said user, a code presented by the user presenting to the RVM which is preferably communicated wirelessly to the RVM, a button on the RVM being pressed by the user, said infeed cover being moved by the user moving to a closed state which blocks the infeed opening, said infeed cover being moved by the user to an open state which expose the infeed opening.

14. The RVM system according to claim 10, wherein said transferring means are configured to transferring a Session ID to a user by an action selected from a group comprising: issuing a physical token to the user; transferring an ID to an electronic device belonging to the user; transferring an ID to a mobile third party electronic device.

15. The RVM system according to claim 10, further comprising transportation means for transporting each of said used containers in said set of used containers to a processing station where said processing is initiated.

16. The RVM system configured to execute a method according to claim 1.

17. The method according to claim 9, wherein the processing circuitry is configured to:

provide a deactivation signal to the automatic locking device when the moveable closing element is to be unlocked.

\* \* \* \* \*